United States Patent [19]
Lucas

[11] Patent Number: 6,035,692
[45] Date of Patent: Mar. 14, 2000

[54] TWO PASS METHOD AND APPARATUS OF FORMING A HEXAGONAL SWAGE FOR WIRE ROPE TERMINATIONS

[75] Inventor: Charles E. Lucas, Tulsa, Okla.

[73] Assignee: The Crosby Group, Inc., Tulsa, Okla.

[21] Appl. No.: 09/233,642

[22] Filed: Jan. 19, 1999

[51] Int. Cl.[7] .................................................. B21D 39/04
[52] U.S. Cl. ............................................. 72/416; 29/517
[58] Field of Search ................................. 72/416; 29/237, 29/517

[56] References Cited

U.S. PATENT DOCUMENTS

| | | | |
|---|---|---|---|
| Re. 31,084 | 11/1982 | Birks | 72/416 |
| 2,151,032 | 3/1939 | Jensen | 29/148 |
| 2,247,928 | 7/1941 | Temple, Jr. | 287/75 |
| 2,346,412 | 4/1944 | Bratz | 29/148 |
| 2,413,547 | 12/1946 | Davidson | 140/113 |
| 2,587,095 | 2/1952 | Bergan | 287/109 |
| 2,622,314 | 12/1952 | Bergan | 29/148 |
| 3,006,983 | 10/1961 | McDurmont | 174/94 |
| 3,101,766 | 8/1963 | Floyd, Jr. | 153/1 |
| 4,047,420 | 9/1977 | Edwards | 72/416 |
| 4,068,962 | 1/1978 | Birks | 403/212 |
| 4,365,501 | 12/1982 | Potts | 72/416 |
| 4,976,132 | 12/1990 | Shaffer | 72/416 |
| 5,121,625 | 6/1992 | Unewisse et al. | 72/416 |
| 5,816,094 | 10/1998 | Birks | 72/416 |

FOREIGN PATENT DOCUMENTS

| | | | |
|---|---|---|---|
| 724888 | 5/1969 | Belgium . | |
| 2690212 | 10/1993 | France . | |
| 1812992 | 7/1969 | Netherlands . | |
| 968220 | 9/1964 | United Kingdom | 72/416 |
| 1 249 352 | 10/1971 | United Kingdom . | |
| PCT/GB94/ 02025 | 9/1993 | WIPO . | |

OTHER PUBLICATIONS

*National Swage*, Swaging Products and Procedures, The Crosby Group, Inc., Tulsa, Oklahoma, 1995.
*Wire Rope Users Manual*, Third Edition, Wire Rope Technical Board, Woodstock, Maryland, 1993.
"An Introduction to CCL Group PLC", CCL Systems, Talurit Division, Leeds, 1994.

*Primary Examiner*—Daniel C. Crane
*Attorney, Agent, or Firm*—Head, Johnson & Kachigian

[57] ABSTRACT

The termination area of a wire rope is formed by a round or oval sleeve that is formed into a quasi-polygonal, preferably quasi-hexagonal, swage using a two pass die closing method using apparatus wherein opposing die cavity faces or sides include a reservoir space for swage material during the first pass of the die closing.

12 Claims, 5 Drawing Sheets

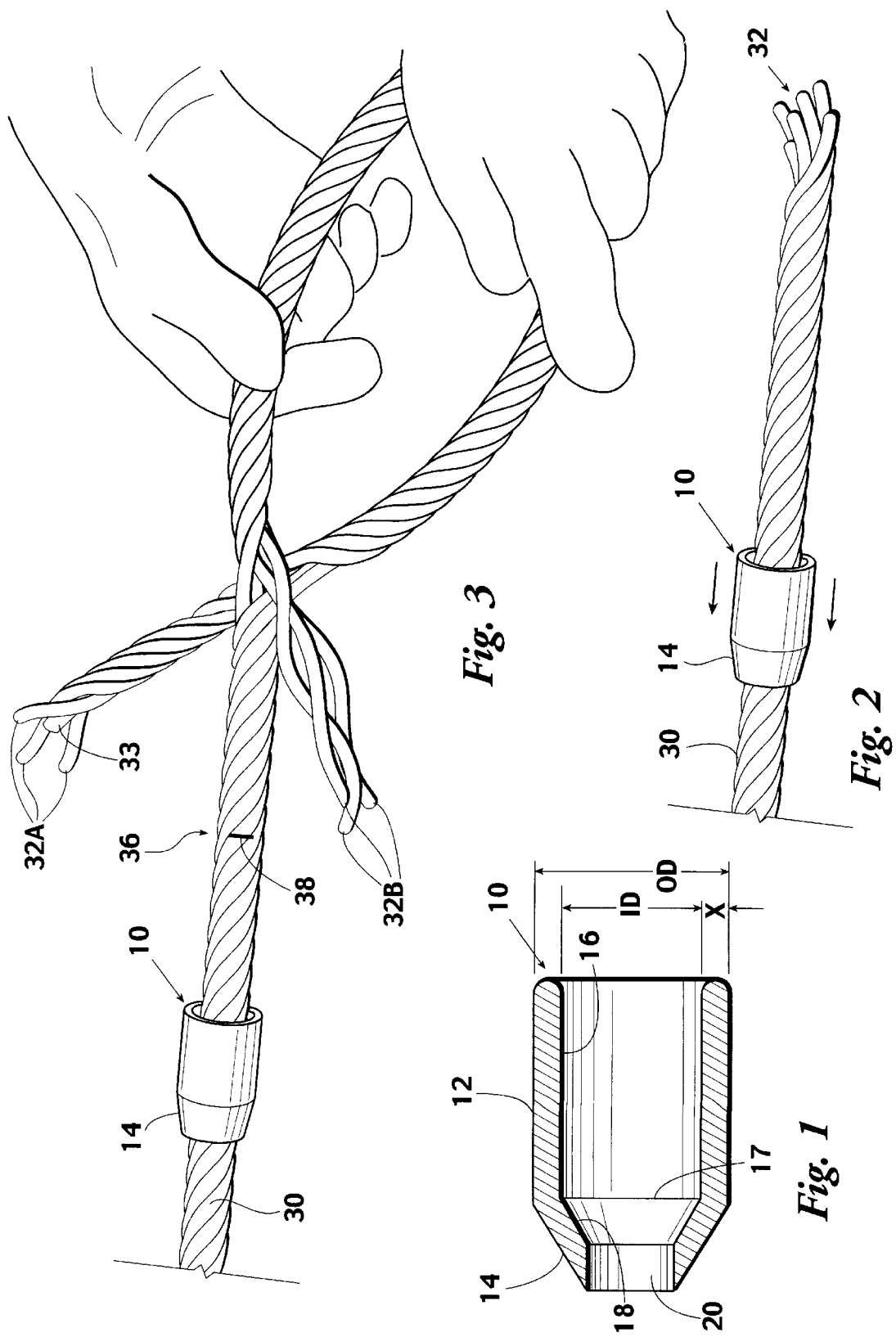

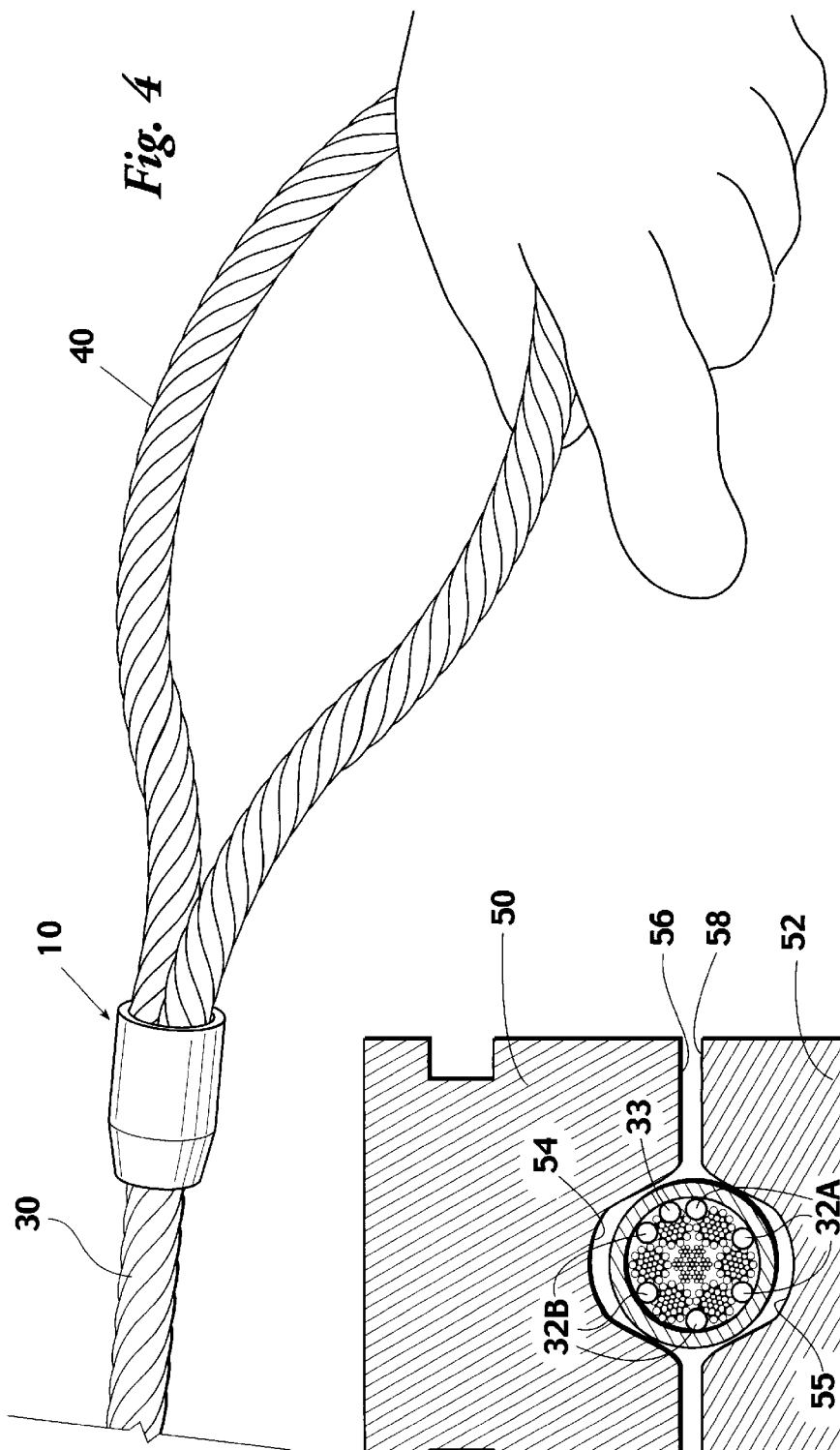

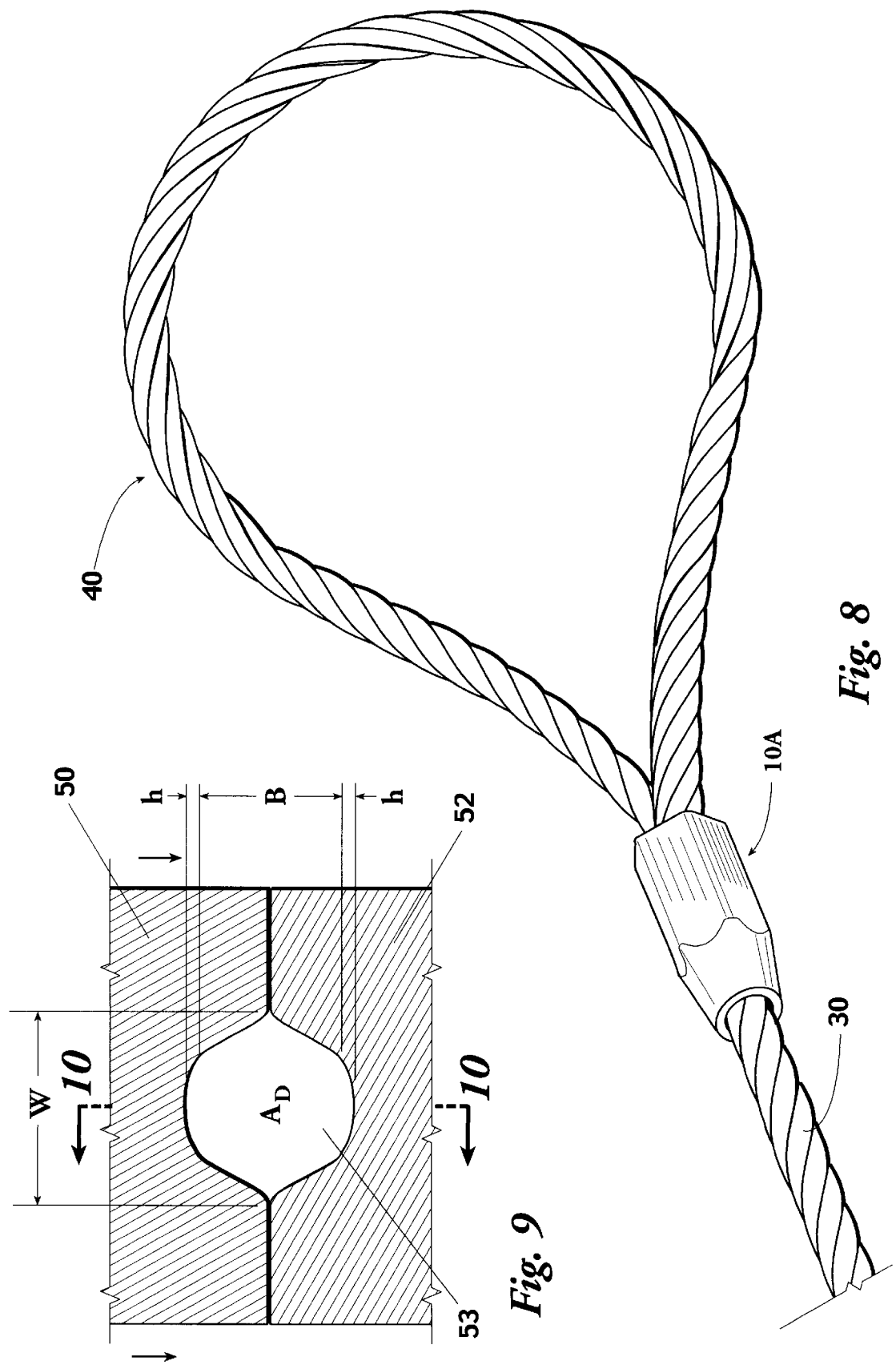

TWO PASS METHOD AND APPARATUS OF FORMING A HEXAGONAL SWAGE FOR WIRE ROPE TERMINATIONS

BACKGROUND OF THE INVENTION

1. Field of the Invention

The present invention is directed to a swaging process and apparatus to produce efficient terminations in wire rope. In particular, the present invention is directed to a swaging process and apparatus to convert a cylindrical swaging sleeve and accompanying wire rope to a polygonal sleeve.

2. Prior Art

Wire rope termination fittings generally comprise cylindrical swaging sleeves that are used in a variety of wire rope terminations. Typically, pre-swaging sleeves are externally and internally cylindrical and sized to receive a particular size of wire rope. A sleeve typically used to form wire rope sling eyes, particularly of the Flemish eye splice form of termination, is cylindrical with one end being tapered such sleeves form the termination by swaging, i.e., cold forming the sleeve to form a strong union with the wire rope. Such swages and methods for forming them are known in the prior art and described in the NATIONAL SWAGE CATALOG of The Crosby Group, Inc.

In the prior swage forming processes, the round sleeve is positioned at the termination point and then placed within open co-acting cylindrical dies. The shape of the cylindrical die represents the size of the finished swage for a given size of wire rope identified as the "after swage dimension". The prior art process requires that the co-acting dies are closed partially to approximately one-half the distance from the time initial contact is made between the sleeves and the dies. The die is then opened and the sleeve is rotated. This step is repeated upwards of 3 to 4 times until the dies actually close and abut to create the after swage dimension sufficient to sustain the working load limits for a given wire rope size. As the size of the wire rope increases even more repeated turning of the sleeve and multiple pressing is required.

One pass swaging has been taught in the prior art such as U.S. Pat. No. 2,151,032; British Patent 1,249,352, dated Oct. 13, 1971; and PCT/GB94/02025 filed Sep. 16, 1994. Such a method and apparatus will create unwanted "flash" of swage material between the die "land" surfaces if the dies are closed too much during the first and second swaging passes.

SUMMARY OF THE INVENTION

The present invention is directed to a further improved apparatus and method of creating a swage of correct after-swage dimension for a given working load limit, based upon the size of wire rope, in fewer passes than required with conventional round cross sectional cavity dies. The working load limit is defined as the maximum mass or force that the product is designed to support in general service when a pull is applied to the wire rope, plus a design (safety) factor. This factor is the product's theoretical reserve load capability computed by dividing the catalog ultimate load by the working load limit. This is generally expressed as a ratio, e.g., 5:1.

A further object of the invention is to provide a process for creating a wire rope termination wherein a round or cylindrical sleeve is die formed by a two pass method of compression into a multi-sided, polygonal, preferably outer hexagonal, shape. To practice the invention, the round sleeve is positioned within co-acting dies having abutting lands. At least one of the co-acting dies possesses a reservoir area to allow the sleeve to flow into the reservoir area upon compression. This prevents sleeve material (flash) from flowing into the area between the abutting lands. In the preferred embodiment, the dies are closed a first time to form the sleeve into a quasi-hexagonal shape. The quasi-hexagonal sleeve will approximate the shape of a hexagon except for the side or sides that are exposed to a reservoir area in a die. The co-acting dies are then opened and the sleeve is rotated one side. The co-acting dies are then again closed, forming the sleeve into a final quasi-hexagonal shape. During the forming process, each time the dies are closed, the lands of the co-acting dies abut. This fact greatly decreases operator attention associated with prior swaging processes. After a double pass utilizing the method described herein, a properly formed swage at the termination point of the wire rope with the after swage dimensions to produce the proper working plus design factor load limits for the size of wire rope is formed.

Specifically, the invention is directed to opposing hexagonal, or polygonal die cavities, wherein at least one, preferably two, of the oppositely facing sides include a reservoir area for swage material to flow at a first full closing of the dies, i.e. the die land surfaces abut. A method includes a second step of rotating the swage one side followed by a second full closing of the dies. The invention being preferably directed to using such method and apparatus to form Flemish eye form of wire rope sling. A third pass may be required where there is excess clearance in the guide supports of the hydraulic swaging machine.

These and other objects of the invention will become more apparent upon further reading of the specification, drawings and claims set forth herein.

BRIEF DESCRIPTION OF THE DRAWINGS

FIG. 1 is a cross sectional view of a typical swaging sleeve as used in this invention.

FIGS. 2, 3 and 4 illustrate the process of pre-forming a wire rope Flemish eye splice.

FIGS. 5, 6, 6A and 7 depict the swaging apparatus and process of this invention.

FIG. 8 is a perspective view of a completed termination.

FIG. 9 is an elevation view of the co-acting dies.

DETAILED DESCRIPTION OF THE PREFERRED EMBODIMENT

Figure 6:
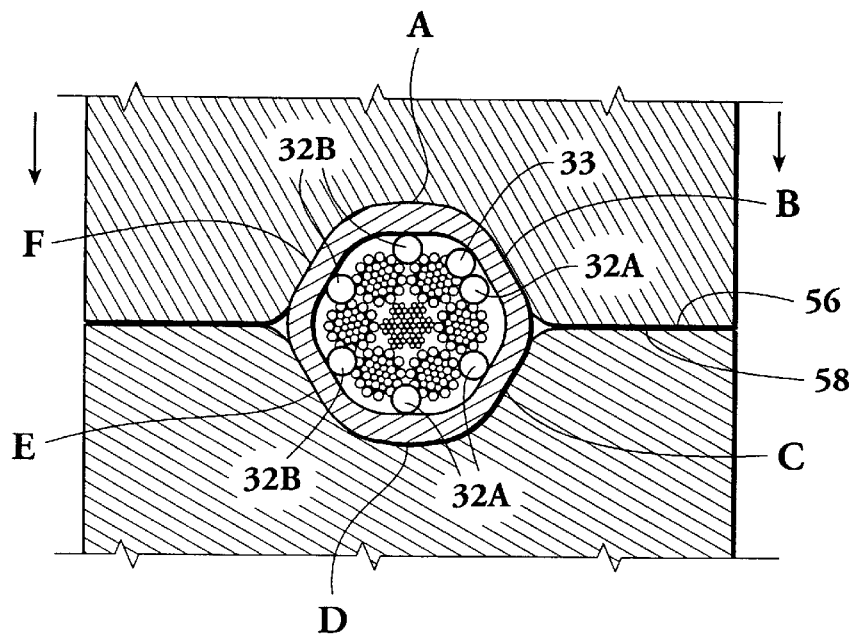

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Referring now to FIG. 1, the steel sleeve as used in this invention and as described in the prior art includes a cylindrical body that is generally designated by the numeral 10 and includes exteriorly a cylindrical body portion 12 of a given OD and a tapered end portion 14. Internally, the sleeve is made up of a cylindrical portion 16 of given ID which terminates at 17 with an internally tapered end 18 and a circular opening 20 that is a size larger than the wire rope size. For instance, using a 1" (25–26 cm) wire rope, opening 20 would be designed approximately larger than 1" while the internal diameter of cylinder 16 is designed approximately to accept the grouping of all wires which comprise tail ends 32A, 32B and running line 30. Such sleeves have ductility sufficient to cold flow plastically at the termination. One such sleeve is sold by The Crosby Group, Inc. under the trademark COLD TUFF®.

The concepts of this invention are particularly applicable to the utilization of a standard round steel sleeve in the construction of a Flemish eye splice at the end of a wire rope but is not limited thereto. Such eye splices and slings are common and useful in conjunction with other hoisting and lifting equipment. The process in accordance with the invention is shown in FIGS. 2 through 8. The so-called Flemish type wire rope sling eye is a mechanical splice of the strands of wire rope. A running portion 30 of the wire rope includes a tail end, generally designated by the numeral 32. As is well known, wire rope is built up of strands of wire laid together. A standard wire rope is typically made of six wire strands and a core. Each strand can be made up of a number of individual wires. The wire strands are helically laid around the core either to the right or to the left with the resulting rope designated as a right-lay or a left-lay. In the Flemish-eye splice, the rope body is opened or unlayed into two parts, one having three strands and the other having the remaining three strands and the case. The rope is unlayed far enough back to allow the loop or eye to be formed by looping one part in one direction and the other part in the other direction.

The core of some wire rope is made of some form of wire or fiber which adds additional strength to the rope. Wire rope is classified as, for example, as "6×19", the first number being the number of strands in the rope and the last number the number of wires in a strand. If there is a wire core, the wire is labelled IWRC (Independent Wire Rope Core). The total metal sectional area of a wire rope is important in the design of the co-acting dies and the process of this invention which will be hereafter detailed. The percentage of unfilled voids is known as the air gap percentage.

As shown in FIGS. 2 and 3, the strands of the tail end 32 are separated into two parts, generally designated as 32A and 32B with a core 33. The sleeve 10 is placed on the running line 30 in the direction as shown. The two parts of the tail end are then re-laid upon the running line 30 to form the eye. The two ends 32A and 32B will then extend to a point 36, which may have been previously marked at 38 which becomes the area of termination. The next step is to slide sleeve 10 forward to the termination point 36 which will encircle the re-laid wire rope forming the spliced Flemish eye generally designated by the numeral 40 as shown in FIG. 4. Up to this point, the process is that which has been well known in the art, and ordinarily, the sleeve would be placed within a round co-acting die in a hydraulic swage to form the swage in a plurality of rotations and passes until the proper after-swage dimension has been reached and gauged. This invention, however, is directed to forming a quasi-hexagonal swage from the round sleeve 10 by the utilization of co-acting dies by a two pass method as shown in FIGS. 5, 6, 6A and 7.

Co-acting dies 50 and 52 are used in a typical hydraulic swaging machine capable of applying many tons of pressure with a lower die 52, generally being fixed within the machine, while die 50 is vertically moveable or vice-versa as shown by the arrows. The die of this invention comprises a quasi hexagonal opening 53. When the upper land 56 and lower land 58 abut, the cross sectional area of opening 53 is critical to the successful formation of a proper quasi-hexagonal after swaged termination. The upper and lower die each contain, in this embodiment, three sides forming the quasi hexagonal cross section but wherein uppermost surface 54 and lowermost surface 55 of the opening are not flat but instead are outwardly curved in a "dome" shape to create a reservoir 51 for swage material during the first pass as shown in FIG. 6.

Figure 6A:
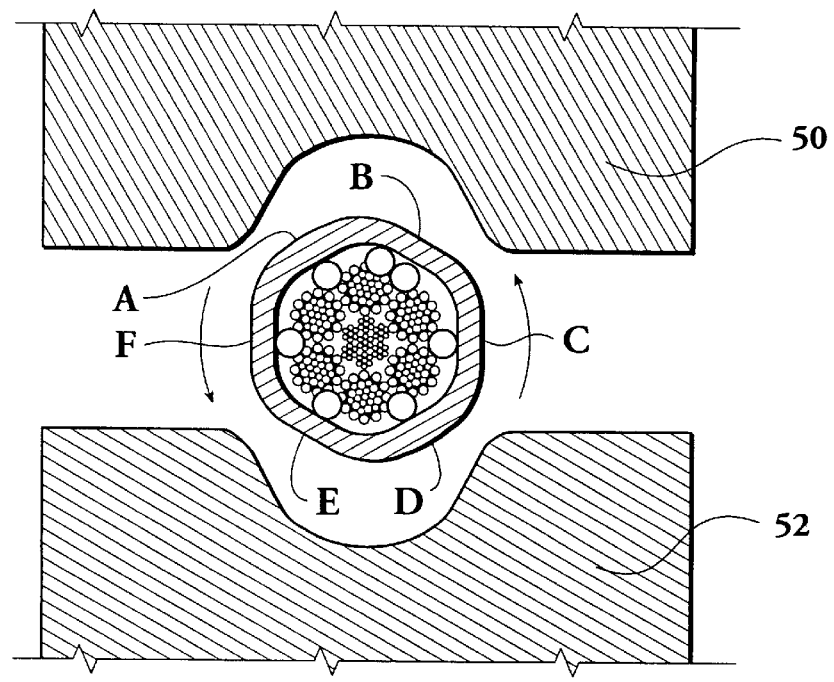
Figure 7:
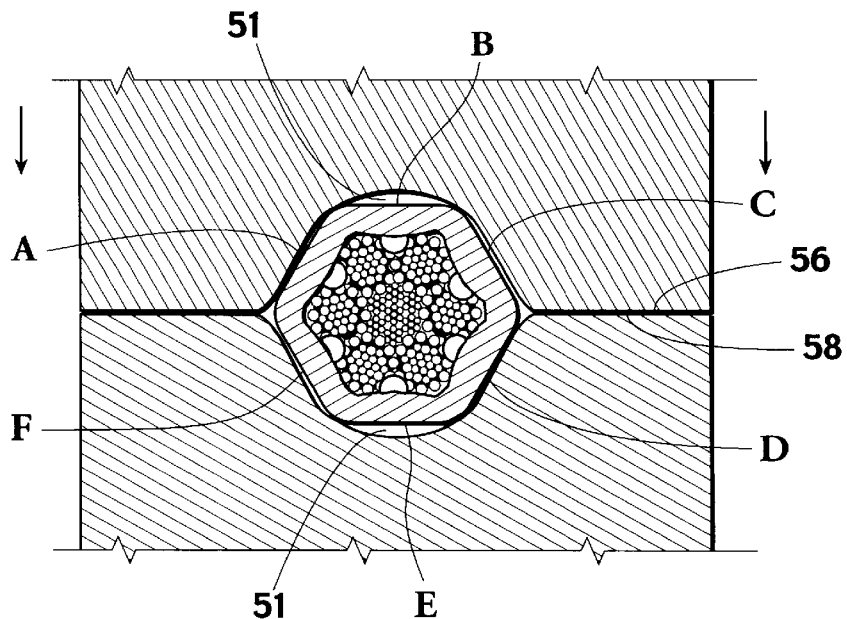

The assembled sleeve as shown in FIG. 4 at the termination area is positioned within the lower die 52, and by way of hydraulic pressure, the die or dies are forced together to apply pressure against the sleeve. Some light oil lubricant is applied to the sleeve. As shown in FIG. 5, the die begins to close upon the cylindrical sleeve 10 to form a pre-formed polygonal, preferably a quasi-hexagonal swage having sides A, B, C, D, E and F, shown in FIGS. 6 and 6A. Other even numbered polygonal shapes greater than six are inclusive of the invention. The purpose of the "dome" shaped reservoir surfaces 54 and 55 for sides A and D is to form an area 51 into which the material of the sleeve can flow. As such, the dies will not form 'flash' or pinch excess material between lands 56 and 58 before closure. As shown, hydraulic pressure is applied to the dies until lands 56 and 58 abut as shown in FIG. 6. After closing upon the sleeve, the die is opened revealing a swage formed in a quasi-hexagonal shape. The next step in the process is to rotate the preformed swage one side or, in this case, 60° to the position such as is shown in FIG. 6A. Closing the dies, at this point, the ductile metal sleeve actually compresses the wire rope and core and flows plastically into the valleys and spaces between component strands as shown in FIG. 7. The die jaws are opened and the finished swaged Flemish eye is removed creating, at the termination area, the final quasi-hexagonal swage form generally designated by the numeral 10A.

Figure 10:
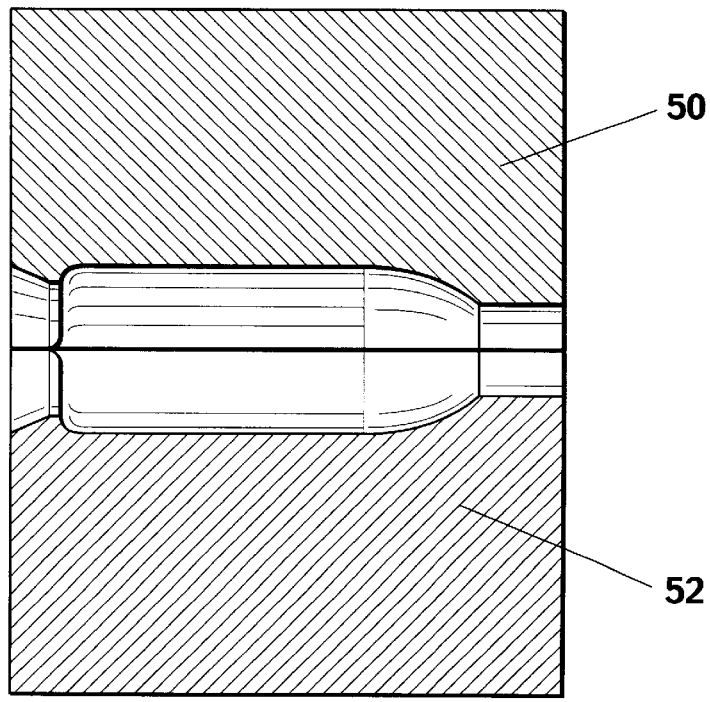
FIG. 10 is a cross-sectional view of one of the co-acting dies.

FIG. 10 illustrates a cross-sectional view of the dies 50 or 52.

An important aspect of the invention is the design of the cross sectional area of the cavity of the co-acting dies designated, as shown in FIG. 9, as $A_D$, including the width "W" and the space between flats "B". The design of a die cavity for a Flemish eye splice termination can be expressed by the following arithmatic steps:

First, the sleeve metallic cross sectional area is determined:

$$A_S = (OD^2 - ID^2) \cdot \frac{\pi}{4}$$

The metallic rope area is calculated:

$$A_r = (D_R^2 \cdot A_f)$$

Where:
  $D_R$=Diameter of rope
  $A_f$=Metallic area factor from wire rope users manual as published by The Wire Rope Technical Board
The hexagonal die area not including the domed shaped reservoir areas 53 is then calculated:

$$A_D = \text{TAN } 30° \ (6)\left(\frac{B}{2}\right)^2$$

Where:
  B=after swage dimension across flats
  It is known that the swaging process will crimp and bring together the individual wire strands within the sleeve. A balance should be found between a tight swage and cutting the wire rope strands which reduces efficiency. Since there will not be total compression, the unfilled voids in cross section within the swage are known as the air gap.

The air gap percent is found:

$$\text{Air Gap \%} = \frac{A_D - (2A_r + A_S)}{A_r} \cdot 100$$

which must be equal to or less than 40%.

The percentage width of the die cavity to the sleeve OD is found:

$$W\% = \frac{2\left(\frac{\frac{B}{2}}{\cos 30°}\right)}{OD} \cdot 100$$

and is to be equal to or greater than 90% of the sleeve OD.

An example of a typical height, "h" of the domed shaped area is a height of 1/16" in a die area designed to produce a 3/4" hexagonal swage.

Although the invention is described relative to a Flemish eye form of termination, the concepts are applicable to other termination forms. Examples include creating hexagonal swage terminations of what is known as a cylindrical swage sockets such as described in the NATIONAL SWAGE catalog of The Crosby Group, Inc. Also, inclusive of the invention is creating a hexagonal swage of an oval sleeve for the what is known as a turnback eye (i.e., wire rope upon wire rope) form of termination as described in the aforesaid NATIONAL SWAGE catalog. The invention is further adapted to wire rope swage buttons as shown in the aforesaid catalog.

What is claimed is:

1. A method for cold forming wire rope terminations comprising the steps of:
   positioning a cylindrical and ductile sleeve at the point of termination, said sleeve having a cylindrical external surface;
   positioning a swaging portion of said sleeve in co-acting dies, said co-acting dies having an opening, said opening being polygonal in cross section with n sides and having abuttable lands where n is an even number greater than 4, said co-acting dies having at least one of said sides forming a reservoir area wherein a pair of said reservoir areas are on oppositely facing sides, said reservoirs accommodating flashing from the sleeve;
   fully closing said co-acting dies upon said sleeve to form a preformed quasi-polygonal swage;
   opening said dies;
   rotating said preformed quasi-polygonal swage an amount V, where V=360°/n;
   fully closing said co-acting dies whereby said lands abut to form a final quasi-polygonal after swage dimension, said reservoirs again accommodating flashing from the sleeve; and
   opening said co-acting dies to remove said swaged termination, said swaged termination having a polygonal external surface.

2. The method of claim 1 where n equals 6.

3. The method of claim 1 wherein said sleeve is a swage socket.

4. The method of claim 3 wherein said termination forms a wire rope Flemish style eye.

5. The method of claim 1 wherein said termination is a button at a wire rope end.

6. The method of claim 1 wherein said after swage dimensions are that which will provide a working load limit including design factor rating for a given size of wire rope.

7. The method of claim 1 wherein the percentage of air gap in a completed swage is determined as follows:

$$\text{AirGap \%} = \frac{A_D - (2A_r + A_S)}{A_r} \cdot 100 = \leq 40\%$$

where $A_r$ is the metallic rope area and $A_D$ is the cross section of the die cavity and $$A_S = (OD^2 - ID^2) \cdot \frac{\pi}{4}.$$

8. A method for cold forming a wire rope Flemish eye termination, comprising the steps of:
   positioning a cylindrical and ductile sleeve over a tail end and upon a running portion of a wire rope, said sleeve having a cylindrical external surface;
   forming a mechanically spliced Flemish eye in said wire rope, wherein said tail end of said wire rope is relayed to a termination area upon said running portion of said wire rope;
   positioning said sleeve in co-acting dies, said co-acting dies having an opening, said opening being quasi-polygonal in cross section with n sides having abuttable lands where n is an even number greater than 4, said die having at least two of said opposite facing sides, said reservoir accommodating flashing from the sleeve forming a reservoir area;
   fully closing said die upon said sleeve to form a preformed quasi-polygonal swage;
   opening said die;
   rotating said preformed quasi-polygonal swage an amount V, where V=360°/n;
   fully closing said co-acting dies whereby said lands abut to form a final quasi-polygonal opening of an after swage dimension, said reservoir again accommodating flashing from the sleeve; and
   opening said co-acting dies to remove said swaged termination, said swaged termination having a polygonal external surface.

9. The method of claim 8 wherein n equals 6.

10. The method of claim 8 wherein said sleeve includes an internally and externally tapered end surface which is positioned toward said running portion.

11. The method of claim 8 wherein said after swage dimensions are such to provide a working load limit including design factor rating for a given size of wire rope.

12. A quasi-hexagonal die cavity for forming a Flemish eye quasi-hexagonal swage from a round cylindrical sleeve of given OD and ID, said die cavity being of cross sectional area $A_D$, with a dimension across flat sides B and width W wherein the percent of air gap in a completed swage is determined from the formula:

$$\text{AirGap \%} = \frac{A_D - (2A_r + A_S)}{A_r} \cdot 100 = \leq 40\%$$

Where:

$$A_D = \text{TAN } 30° \, (6)\left(\frac{B}{2}\right)^2$$

$A_r$ = Metallic rope area $$A_S = (OD^2 - ID^2) \cdot \frac{\pi}{4}$$

and where the percentage width W is determined from the formula:

$$W \% = \frac{2\left(\frac{\frac{B}{2}}{\text{Cos } 30°}\right)}{OD} \cdot 100 = \geq 90°.$$

* * * * *